Oct. 24, 1950     C. T. WILSON     2,527,343
TRACTOR HITCH
Filed March 13, 1947     2 Sheets-Sheet 1
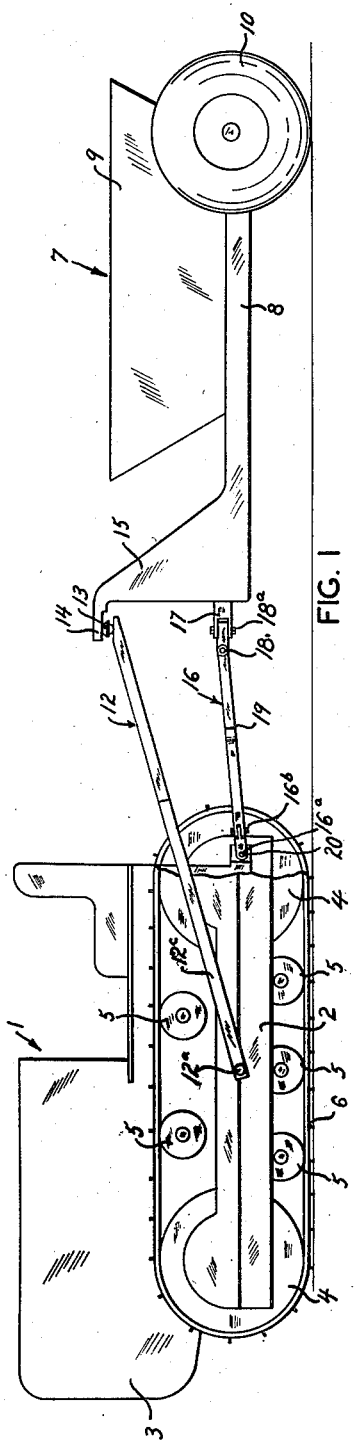
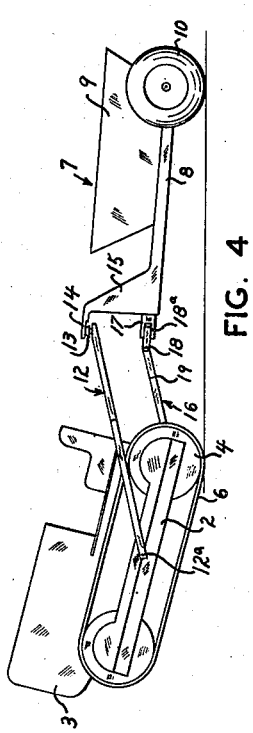
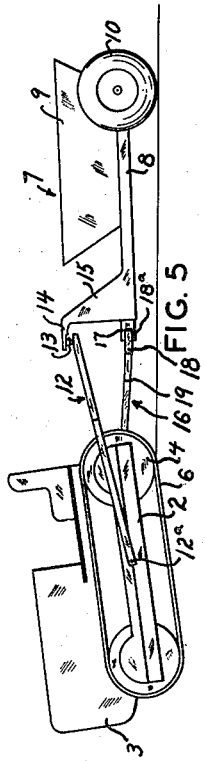
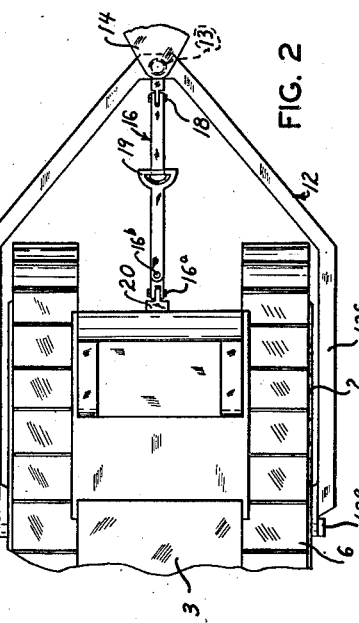
INVENTOR
CLARENCE T. WILSON
BY *Rodney Bessell*
ATTORNEY Oct. 24, 1950 C. T. WILSON 2,527,343
TRACTOR HITCH Filed March 13, 1947 2 Sheets-Sheet 2

INVENTOR
CLARENCE T. WILSON

BY Rodney Bedell
ATTORNEY

Patented Oct. 24, 1950

2,527,343

UNITED STATES PATENT OFFICE 2,527,343

TRACTOR HITCH

Clarence T. Wilson, Clayton, Mo.

Application March 13, 1947, Serial No. 734,421

11 Claims. (Cl. 280—33.4)

The invention relates to a hitch for securing a tractor to a trailer, scraper, plow or other trailing device to be drawn by the tractor.

A trailer, or other wheeled device, having its center of gravity forwardly of the wheels, is hitched to the tractor so that the weight of the forward end of the device is carried by the tractor. Hitches as used heretofore concentrate the weight of the device on the rear wheels of the tractor. This arrangement is undesirable particularly when a four-wheel drive or endless tread type tractor is used, because the front wheels afford little or no traction and may be raised off the ground when the draft load becomes excessive. This same condition occurs with wheelless devices secured to the tractor. To counteract this difficulty, the front end of the tractor frequently is weighted to hold it on the ground but this constitutes an extra load resulting in reduced efficiency.

The main object of the invention is to overcome these difficulties by distributing the total load of the device (which may include a portion of the weight of the device and its lading and the resistance of the device to forward movement) in any desired proportion to the tractor front and rear wheels.

Another object of the invention is to provide for relative vertical and angular movement between the tractor and device without substantially affecting the distribution of the load applied to the tractor.

Another object of the invention is to arrange the point of application of the load to the tractor intermediate its length while forming a "fifth" wheel connection to the device at the rear of the tractor.

Another object of the invention is to increase traction when the draft load applied to the tractor increases and to distribute the traction component of the draft load substantially uniformly on the tractor wheels.

Another object is to limit relative vertical angular movement of the tractor and device to prevent the tractor from tipping backwards if forward movement of the device is halted by an immovable object.

Other objects and advantages will be apparent to those skilled in the art from the following description and accompanying drawings, in which:

Figure 1 is an elevation of a tractor and trailer provided with a hitch constructed according to the invention.

Figure 2 is a top view of the rear of the tractor and of the hitch.

Figure 3 is a top view of a draw bar of the hitch drawn to enlarged scale.

Figures 4 and 5 are schematic views showing the manner in which the hitch accommodates relative vertical angular movement of the tractor and trailer.

Figure 6:
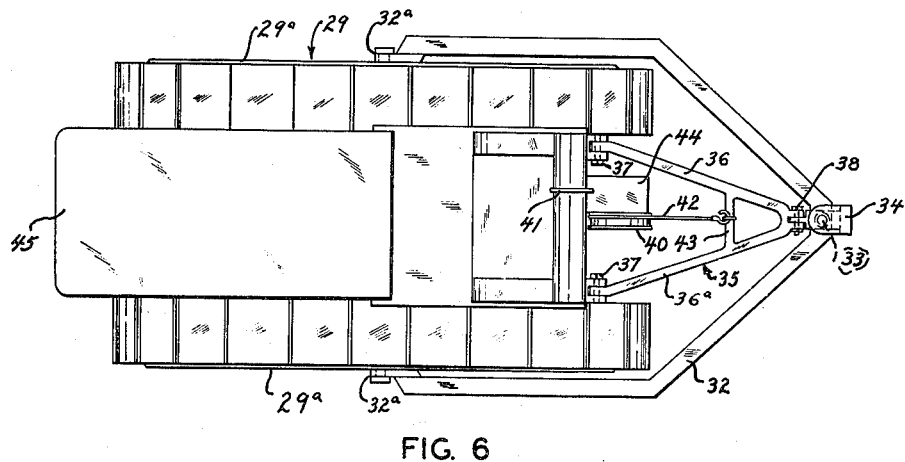
Figure 6 is a top view of the rear of a tractor connected to a plow by a hitch constructed according to the invention.

The tractor 1 includes a frame 2, a power unit 3, and drive wheels 4 and idlers 5 on which are mounted an endless tread 6. The tractor preferably has pairs of drive wheels, at or near the front and rear ends, which may be equipped with rubber tires, cleats or endless treads as shown.

In Figures 1–5, a trailer 7 is drawn by the tractor and comprises a frame 8 mounting a body 9 and supported on wheels 10. The front end of the trailer is supported by the tractor. The trailer may be of any type but the invention is adapted particularly for use with ground moving equipment, such as scrapers or carriers, where a great tractive effort is required to drag the trailer.

The hitch forming the subject matter of this invention includes a wish-bone shaped member 12 having legs 12b and 12c pivoted at their forward ends 12a to opposite sides of tractor frame 2 between the front and rear wheels substantially at the longitudinal center of the tractor. Member 12 extends upwardly and rearwardly and its rear end is attached by a ball and socket connection 13 to the upper portion 14 of an upright 15 on the front end of trailer frame 8.

A draw bar 16 at its forward end is connected through link pins 16a, 16b to a tractor coupler 20 to provide for relative vertical and horizontal pivotal movement of the draw bar and coupler. The opposite end of draw bar 16 is connected through link pins 18, 18a to the lower portion 17 of upright 15 to provide for relative vertical and horizontal pivotal movement of the bar and trailer. Draw bar 16 includes a swivel 19 to accommodate relative tilting of the tractor and trailer about their longitudinal axes.

Draw bar 16 preferably extends upwardly and rearwardly when the tractor and trailer are aligned horizontally, but the slope of bar 16 preferably is less than the slope of member 12 so that bar 16 and member 12 converge at their forward ends.

The weight of the forward portion of the trailer is carried by the triangular support 12, 2, 16, 15. Any downward movement of the rear end of member 12 and resulting tendency to rearward movement of the trailer is restrained by draw bar 16.

When the tractor and trailer round a curve, member 12 and bar 16 move angularly with the tractor and pivot about 13 and 18a to accommodate lateral angling of the tractor and trailer.

When the tractor moves along a surface inclined relative to the trailer supporting surface (see Figures 4 and 5), the linkage pivots at 12a, 16a, 18 and 13 to accommodate vertical angling of the tractor and trailer.

When the tractor and trailer tilt about their longitudinal axes, the linkage pivots at 16b, 18a and 13 and twists at swivel 19.

The forward weight of the trailer and the traction component of the draft load is applied to the tractor through member 12 forwardly of the tractor rear axle and it is distributed substantially uniformly along the tractor treads or wheels for all positions of the tractor and trailer to provide increased traction. The horizontal component of the draft load is applied to the tractor through draw bar 16 at a point behind and below the tractor rear axle. Resistance of the trailer to forward movement tends to lower the forward end of the trailer, thereby exerting a compressive force on member 12 which pushes downwardly and forwardly at 12a on the tractor to increase its traction.

The distribution of the load on the front and rear tractor wheels may be changed by shifting the connection of the forward ends 12a of member 12 forwardly or rearwardly of the tractor frame.

Bar 16 may be positioned horizontally when the tractor and trailer are aligned horizontally, but preferably slopes upwardly and rearwardly, as shown in Figure 1. With either arrangement, the traction of the tractor increases with increased draft load and the traction component of the draft load is applied through member 12 substantially uniformly to the front and rear wheels. Relative vertical angular movement of the tractor and trailer is limited by the hitch so that the tractor cannot tip backwards if forward movement of the trailer is halted by an immovable object.

Figure 7:
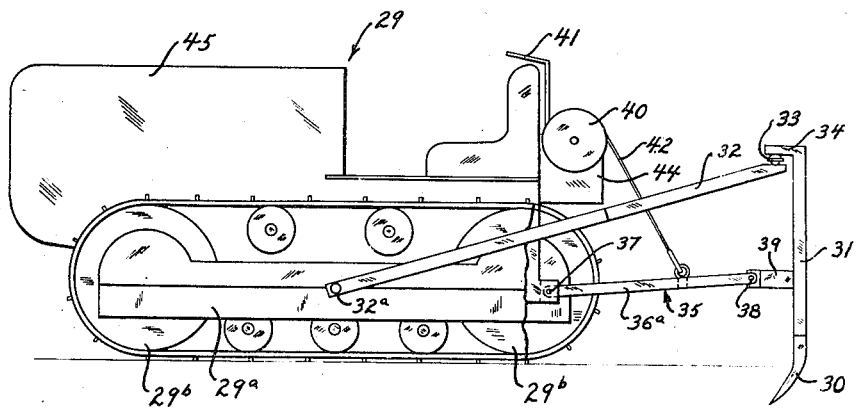
Figure 7 is an elevation of the tractor plow and hitch shown in Figure 6.

In Figures 6 and 7, a root hook 30 carried by an upright 31 is drawn by a tractor 29. The hitch comprises a wish-bone shaped member 32 (similar to member 12 of Figures 1–5) pivoted at its forward ends 32a to opposite sides of the tractor frame 29a between the front and rear tractor wheels 29b. Member 32 extends upwardly and rearwardly and its rear end is attached to the upper portion 34 of upright 31 by a ball and socket connection 33.

An upwardly and rearwardly extending drawbar 35 has legs 36 and 36a connected at their forward ends through pins 37 to the rear end of the tractor frame to provide for vertical movement of the drawbar relative to the tractor. The opposite end of the drawbar 35 is connected through a pin 38 to the lower portion 39 of upright 31 to provide for relative vertical movement of the drawbar and upright. Root hook 30 may be raised or lowered relative to the tractor, to vary its depth of penetration into the soil, by a winch 40 secured to the rear of the tractor frame and operated through a power take-off 44 from the tractor power unit 45. Operation of the winch is controlled by a handle 41. When the winch 40 is operated, a cable 42, attached to a cross bar 43 on legs 36 and 36a, winds or unwinds on the winch to raise or lower root hook 30.

During normal operation, the downward thrust on the hook is carried by cable 42. Resistance of the hook to forward movement tends to tilt the upper portion 34 of upright 31 toward the tractor, thereby exerting a compressive force on member 32 which pushes downwardly and forwardly at 32a on the tractor to increase its traction.

The hitch may be used on truck tractor and trailer assemblies, farm implements supported partially or wholly by the tractor, earth moving equipment or any tractor and tractor-drawn combination where it is desirable to distribute a substantial portion of the load to the forward wheels of the tractor.

The details of the construction may be varied substantially without departing from the spirit of the invention and the use of those modifications coming within the scope of the claims is contemplated.

What is claimed is:

1. In a hitch securing a tractor to a device drawn thereby and converting draft load to traction, an upright on the device, an inclined rigid member leading from the upper portion of said upright to the tractor between its front and rear axles, and an inclined drawbar leading from the lower portion of said upright to the tractor rearwardly of its rear axle, there being pivotal connections between the member and drawbar and the tractor and device accommodating relative vertical angular movement of the tractor and device.

2. In a hitch for securing a tractor to a trailing device and for increasing traction by supporting a portion of the trailing device weight on the tractor and by converting draft load to traction, a rigid member attachable to the tractor forwardly of its rear axle for relative pivotal movement, and attachable to the trailing device at a point higher than the point of attachment to the tractor for relative universal movement, and a drawbar attachable to the tractor for relative vertical pivotal movement and attachable to the trailing device for relative universal movement, the point of attachment of the draw bar to the tractor being spaced from the point of attachment of said member to the tractor.

3. In a hitch for securing a tractor to a trailing device and for increasing traction by supporting a portion of the trailing device weight on the tractor and by converting draft load to traction and for distributing the same substantially uniformly on the tractor wheels, a rearwardly and upwardly extending wish-bone shaped rigid member pivoted at its forward end to the sides of the tractor substantially at the tractor longitudinal center and connected at its rear end to the front of the trailing device for universal movement, and a drawbar attached to the rear of said tractor for vertical pivotal movement and to the front of said trailing device for relative universal movement.

4. In a hitch for securing a tractor to a trailing device, a rearwardly and upwardly extending wish-bone shaped rigid member pivoted at its forward end to the sides of the tractor substantially at the tractor longitudinal center and connected at its rear end to the front of the trailing device for universal movement, and a drawbar attached to the rear of said tractor and to the front of said trailing device for relative universal movement, said draw bar having a swivel to accommodate relative angular movement of the tractor and trailing device about their longitudinal axes.

5. In a hitch for securing a tractor to a trailing device and for supporting a portion of the trailing device weight on the tractor and distributing the same substantially uniformly on the tractor wheels to increase traction, a load supporting rigid member extending upwardly and rearwardly and pivoted to the tractor substantially at its longitudinal center and connected to the trailing device for universal movement relative thereto, and a draw bar substantially shorter than said member and inclined thereto attached for relative vertical pivotal movement to said tractor and for relative universal movement to said trailing device.

6. In a hitch for securing a tractor to a device drawn thereby, a wish-bone shaped rigid member having spaced legs attached at their forward ends to the sides of the tractor substantially at the tractor longitudinal center, said member being attached at its rear end to the device, and a drawbar having spaced legs attached at their forward ends to the rear of the tractor, said drawbar being attached at its rear end to the device, said member and drawbar being arranged for vertical pivotal movement about their points of attachment to the tractor and device.

7. In combination, a power driven tractor including front and rear wheels and axles, a trailing device having its forward end supported by the tractor, and means to secure the tractor to the trailing device so that the weight of the trailer carried by the tractor is distribtued substantially uniformly on the tractor wheels, and so that draft load is converted into traction, said means comprising a rigid member attached for relative vertical pivotal movement to the tractor forwardly of its rear axle, and a draw bar attached for relative vertical pivotal movement to the tractor rearwardly of its rear axle, and said member and said draw bar being connected for relative universal movement to the trailing device.

8. In combination with a tractor having front and rear wheels and axles and a frame between them, and a trailer having supporting wheels and a frame extending forwardly therefrom, the center of gravity of the trailer being forwardly of its wheels, a hitch between the tractor and trailer comprising an inclined strut leading downwardly from the front end of the trailer to the tractor frame between the front and rear axles, and an inclined draw bar positioned below said strut and at an angle thereto and leading from the front end of the trailer to the rear of the tractor frame.

9. In combination with a tractor having front and rear wheels and axles and a frame between them, and a trailer having supporting wheels and a frame extending forwardly therefrom, the center of gravity of the trailer being forwardly of its wheels, a hitch between the tractor and trailer comprising an inclined strut leading downwardly from the front end of the trailer to the tractor frame between the front and rear axles, and a draw bar leading from the front end of the trailer to the rear of the tractor frame, there being pivotal connections between the strut and draw bar and the tractor and trailer accommodating relative vertical angular movement of the connected parts.

10. In combination with a tractor having front and rear wheels and axles and a frame between them, and a trailer having supporting wheels and a frame extending forwardly therefrom, the center of gravity of the trailer being forwardly of its wheels, a hitch between the tractor and trailer comprising an upright on the trailer, an inclined strut leading from the upper portion of said upright to the tractor frame between the front and rear axles, and a draw bar leading from the lower portion of said upright to the rear of the tractor frame, the tractor having pivotal connections to the strut and draw bar and the trailer having universal joint connections to the strut and draw bar, said connections accommodating relative vertical and lateral angular movement of the tractor and trailer.

11. A combination as described in claim 10 in which the draw bar includes a swivel joint intermediate its ends to accommodate relative angular movement of the tractor and trailer about longitudinal axes.

CLARENCE T. WILSON.

REFERENCES CITED

The following references are of record in the file of this patent:

UNITED STATES PATENTS

| Number | Name | Date |
|---|---|---|
| 1,377,609 | Townsend | May 10, 1921 |
| 1,775,268 | Baldwin et al. | Sept. 9, 1930 |
| 1,785,124 | Jett | Dec. 16, 1930 |
| 2,347,898 | Ferguson | May 2, 1944 |
| 2,393,358 | Ferguson | Jan. 22, 1946 |